United States Patent
Wells et al.

(10) Patent No.: US 8,912,255 B2
(45) Date of Patent: Dec. 16, 2014

(54) SELF-CONSOLIDATING CONCRETE (SCC) MIXTURE HAVING A COMPRESSIVE STRENGTH OF AT LEAST 25 MPA AT 28 DAYS OF AGE

(75) Inventors: Mark Wells, Komoka (CA); Philip Zacarias, Mississauga (CA); Bryan Schulz, Markham (CA); Matthew Stokkermans, Forest (CA)

(73) Assignee: St. Marys Cement Inc. (Canada), Toronto (CA)

( * ) Notice: Subject to any disclaimer, the term of this patent is extended or adjusted under 35 U.S.C. 154(b) by 46 days.

(21) Appl. No.: 13/565,366

(22) Filed: Aug. 2, 2012

(65) Prior Publication Data
US 2014/0039097 A1    Feb. 6, 2014

(51) Int. Cl.
| | | |
|---|---|---|
| *C04B 26/18* | (2006.01) | |
| *C04B 28/00* | (2006.01) | |
| *C04B 14/00* | (2006.01) | |
| *C04B 28/04* | (2006.01) | |
| *C04B 20/00* | (2006.01) | |
| *C04B 111/00* | (2006.01) | |

(52) U.S. Cl.
CPC ....... *C04B 26/18* (2013.01); *C04B 2111/00103* (2013.01); *C04B 28/04* (2013.01); *C04B 20/0096* (2013.01)
USPC .............. 524/5; 106/724; 106/738; 106/713; 106/400

(58) Field of Classification Search
USPC ...................... 524/5; 106/724, 738, 713, 400
See application file for complete search history.

(56) References Cited

U.S. PATENT DOCUMENTS

| | | |
|---|---|---|
| 2009/0158960 A1 | 6/2009 | Andersen |
| 2010/0197818 A1* | 8/2010 | Sweat et al. ................. 521/56 |

OTHER PUBLICATIONS

Eric Patrick Koehler, Doctoral Dissertation, University of Texas—Austin, 2007, "Aggregates of Self-Consolidating Concrete", UMI #3277550.*
Jane Stewart, Justin Norvell, Maria Juenger, and Dr. David Fowler, Characterizing Minus No. 200 Fine Aggregate for Performance in Concrete, ICAR Report 107-1, International Center for Aggregate Research, The University of Texas—Austin, Mar. 2003, 184 pages.*
Liquid 40%50% polycarboxylate ether, water reducing concrete admixture, high-performance powder superplasticizer. http://www.alibaba.com/product-gs/607414053/Liquid_40_50_polycarboxylate_ether_water.html.*
Eric Koehler and David Fowler, "Dust-of-Fracture Aggregate Microfines in Self-Consolidating Concrete", ACI Materials Journal, vol. 105, No. 2, Mar.-Apr. 2008, p. 165-173.*
Eric P. Koehler and David W. Fowler, Dust-of-Fracture Aggregate Microfines in Self-Consolidating Concrete, ACI Materials Journal, V. 105, No. 2, Mar.-Apr. 2008, p. 165-173.
Syed Ali Rizwan and Thomas A. Bier, Self-Consolidating Mortars Using Various Secondary Raw Materials, ACI Materials Journal, V. 106, No. 1, Jan.-Feb. 2009, p. 25-32.
Jane Stewart, Justin Norvell, Maria Juenger and Dr. David W. Fowler, Characterizing Minus No. 200 Fine Aggregate for Performance in Concrete, ICAR Report 107-1, International Center for Aggregates Research The University of Texas at Austin, Mar. 2003, 184 pages.
Grace Rapid Clay Test Kit, Step-by-Step Procedure, Version C2, Feb. 2011.

* cited by examiner

*Primary Examiner* — Ling Choi
*Assistant Examiner* — Ronald Grinsted
(74) *Attorney, Agent, or Firm* — Ridout and Maybee LLP

(57) ABSTRACT

The present disclosure describes a self-consolidating concrete (SCC) mixture having a compressive strength of at least 25 MPa at 28 days of age. In accordance with one embodiment, there is provided an SCC mixture, comprising: a mixture of coarse aggregate (CA), fine aggregate (FA), very fine aggregate (VFA), cementitious materials including Portland cement or Portland limestone cement, an ASTM C494 Type F polycarboxylate ether high range water reducer, and water, wherein the VFA has a particle size distribution in which 95% to 100% passes a 2.5 mm sieve and in which 20% to 100% passes a 75 μm sieve.

26 Claims, 5 Drawing Sheets

Sieve Comparison

| ISO 565 (TBL 2) 1987 | ASTM E 11 1995 | BS 410 1986 | AFNOR NFX11-501 1987 | DIN 4188 1977 |
|---|---|---|---|---|
| Nominal Opening (Millimeters/Microns) | Alternative Inch/Mesh | Aperture mm/μm | Opening mm/μm | Aperture mm |
| 26.50mm | 1.06 " | 26.50mm | 25.0mm | 25.00 |
| 25.00mm | 1 " | -- | 22.40mm | 22.40 |
| 22.40mm | 7/8" | 22.40mm | 20.00mm | 20.00 |
| 19.00mm | 3/4" | 19.00mm | 18.00mm | 18.00 |
| 16.00mm | 5/8" | 16.00mm | 16.00mm | 16.00 |
| 13.20mm | .530" | 13.20mm | 14.00mm | 14.00 |
| 12.50mm | 1/2" | -- | 12.50mm | 12.50 |
| 11.20mm | 7/16" | 11.20mm | 11.20mm | 11.20 |
| 9.50mm | 3/8" | 9.50mm | 10.00mm | 10.00 |
| -- | -- | -- | 9.00mm | 9.00 |
| 8.00mm | 5/16" | 8.00mm | 8.00mm | 8.00 |
| 6.70mm | .265" | 6.70mm | 7.10mm | 7.10 |
| 6.30mm | 1/4" | -- | 6.30mm | 6.30 |
| 5.60mm | 3-1/2 sieve | 5.60mm | 5.60mm | 5.60 |
| 4.75mm | 4 sieve | 4.75mm | 5.00mm | 5.00 |
| -- | -- | -- | 4.50mm | 4.50 |
| 4.00mm | 5 sieve | 4.00mm | 4.00mm | 4.00 |
| 3.35mm | 6 sieve | 3.35mm | 3.55mm | 3.55 |
| -- | -- | -- | 3.15mm | 3.15 |
| 2.80mm | 7 sieve | 2.80mm | 2.80mm | 2.80 |
| 2.36mm | 8 sieve | 2.36mm | 2.50mm | 2.50 |
| -- | -- | -- | 2.24mm | 2.24 |
| 2.00mm | 10 sieve | 2.00mm | 2.00mm | 2.00 |
| 1.70mm | 12 sieve | 1.70mm | 1.80mm | 1.80 |
| -- | -- | -- | 1.60mm | 1.60 |
| -- | -- | -- | -- | 1.50 |
| 1.40mm | 14 sieve | 1.40mm | 1.40mm | 1.40 |
| 1.18mm | 16 sieve | 1.18mm | 1.25mm | 1.25 |
| -- | -- | -- | -- | 1.20 |
| -- | -- | -- | 1.12mm | 1.12 |
| 1.00mm | 18 sieve | 1.00mm | 1.00mm | 1.00 |
| 850μm | 20 sieve | 850μm | 900μm | 0.900 |
| -- | -- | -- | 800μm | 0.800 |
| -- | -- | -- | -- | 0.750 |
| 710μm | 25 sieve | 710μm | 710μm | 0.710 |
| -- | -- | -- | 630μm | 0.630 |
| 600μm | 30 sieve | 600μm | -- | 0.600 |
| -- | -- | -- | 560μm | 0.560 |

FIG. 3

Sieve Comparison (Continued)

| ISO 565 (TBL 2) 1987 Nominal Opening (Millimeters/Microns) | ASTM E 11 1995 Alternative Inch/Mesh | BS 410 1986 Aperture mm/μm | AFNOR NFX11-501 1987 Opening mm/μm | DIN 4188 1977 Aperture mm |
|---|---|---|---|---|
| 500μm | 35 sieve | 500μm | 500μm | 0.500 |
| -- | -- | -- | 450μm | 0.450 |
| 425μm | 40 sieve | 425μm | -- | 0.430 |
| -- | -- | -- | 400μm | 0.400 |
| 355μm | 45 sieve | 355μm | 355μm | 0.355 |
| -- | -- | -- | -- | 0.340 |
| -- | -- | -- | 315μm | 0.315 |
| 300μm | 50 sieve | 300μm | -- | 0.300 |
| -- | -- | -- | 280μm | 0.280 |
| 250μm | 60 sieve | 250μm | 250μm | 0.250 |
| 212μm | 70 sieve | 212μm | 224μm | 0.224 |
| -- | -- | -- | 200μm | 0.200 |
| 180μm | 80 sieve | 180μm | 180μm | 0.180 |
| -- | -- | -- | -- | 0.170 |
| -- | -- | -- | 160μm | 0.160 |
| 150μm | 100 sieve | 150μm | -- | 0.150 |
| -- | -- | -- | 140μm | 0.140 |
| 125μm | 120 sieve | 125μm | 125μm | 0.125 |
| -- | -- | -- | -- | 0.120 |
| 106μm | 140 sieve | 106μm | 112μm | 0.112 |
| -- | -- | -- | 100μm | 0.100 |
| 90μm | 170 sieve | 90μm | 90μm | 0.090 |
| -- | -- | -- | 80μm | 0.080 |
| 75μm | 200 sieve | 75μm | -- | 0.075 |
| -- | -- | -- | 71μm | 0.071 |
| -- | -- | -- | -- | 0.067 |
| 63μm | 230 sieve | 63μm | 63μm | 0.063 |
| -- | -- | -- | -- | 0.060 |
| 53μm | 270 sieve | 53μm | 56μm | 0.056 |
| -- | -- | -- | 50μm | 0.050 |
| 45μm | 325 sieve | 45μm | 45μm | 0.045 |
| 38μm | 400 sieve | 38μm | 40μm | 0.040 |
| -- | -- | -- | 36μm | 0.036 |
| 32μm | 450 sieve | 32μm | 32μm | 0.032 |
| 25μm | 500 sieve | -- | 25μm | 0.025 |
| 20μm | 635 sieve | -- | 20μm | 0.020 |
| 16μm | -- | -- | -- | 0.016 |
| 10μm | -- | -- | -- | 0.010 |

FIG. 3 (Continued)

Example 2-1

| Cement (kg/m³) | Slag (kg/m³) | Total Cement (kg/m³) | Design H₂O/m³ | (VFA+ H₂O)/m³ | Moisture in VFA (%) | Water in VFA (L/m³) | VFA (kg/m³) | Particles passing 75 μm seive (kg/m³) | Post Batching Water L/m³ | Total Water (L/m³) | w/c ratio (fraction) | Slump Flow (mm) | Average 28 Day Compressive Strength(MPa) |
|---|---|---|---|---|---|---|---|---|---|---|---|---|---|
| 202 | 68 | 270 | 175 | 285 | 8 | 22.8 | 262.2 | 65.55 | 10 | 207.8 | 0.77 | 600 | 35.5 |
| 202 | 68 | 270 | 175 | 285 | 8 | 22.8 | 262.2 | 65.55 | 10 | 207.8 | 0.77 | 590 | 39.1 |
| 202 | 68 | 270 | 159 | 285 | 10 | 28.5 | 256.5 | 64.125 | 28 | 215.5 | 0.80 | 650 | 35.7 |
| 216 | 54 | 270 | 170 | 285 | 8 | 22.8 | 262.2 | 65.55 | 14 | 206.8 | 0.77 | 600 | 28.3 |
| 252 | 28 | 280 | 175 | 285 | 10 | 28.5 | 256.5 | 64.125 | 14 | 217.5 | 0.78 | 590 | 33 |
| 252 | 28 | 280 | 175 | 300 | 12 | 36 | 264.0 | 66 | 13.3 | 224.3 | 0.80 | 590 | 31.9 |
| 252 | 28 | 280 | 175 | 300 | 12 | 36 | 264.0 | 66 | 14 | 225 | 0.80 | 590 | 42 |
| 280 | 0 | 280 | 175 | 336 | 12 | 40.3 | 295.7 | 73.92 | 0 | 215.3 | 0.77 | 600 | 30.5 |

Example 2-2

| Cement (kg/m³) | Slag (kg/m³) | Total Cement (kg/m³) | Design H₂O/m³ | (VFA+ H₂O)/m³ | Moisture in VFA (%) | Water in VFA (L/m³) | VFA (kg/m³) | Particles passing 75 μm seive (kg/m³) | Post Batching Water L/m³ | Total Water (L/m³) | w/c ratio (fraction) | Slump Flow (mm) | Average 28 Day Compressive Strength(MPa) |
|---|---|---|---|---|---|---|---|---|---|---|---|---|---|
| 252 | 28 | 280 | 175 | 318 | 6 | 18 | 298.9 | 74.7 | 8 | 201 | 0.72 | 625 | 28.4 |
| 252 | 28 | 280 | 175 | 318 | 6 | 18 | 298.9 | 74.7 | 10 | 203 | 0.73 | 590 | n/a |

Example 2-3

| Cement (kg/m³) | Slag (kg/m³) | Total Cement (kg/m³) | Design H₂O/m³ | (VFA+ H₂O)/m³ | Moisture in VFA (%) | Water in VFA (L/m³) | VFA (kg/m³) | Particles passing 75 μm seive (kg/m³) | Post Batching Water L/m³ | Total Water (L/m³) | w/c ratio (fraction) | Slump Flow (mm) | Average 28 Day Compressive Strength(MPa) |
|---|---|---|---|---|---|---|---|---|---|---|---|---|---|
| 252 | 28 | 280 | 175 | 297 | 6 | 16.8 | 279.2 | 69.8 | 9 | 200.8 | 0.72 | 600 | n/a |
| 252 | 28 | 280 | 175 | 297 | 6 | 16.8 | 279.2 | 69.8 | 10 | 201.8 | 0.72 | 600 | 28.4 |

SELF-CONSOLIDATING CONCRETE (SCC) MIXTURE HAVING A COMPRESSIVE STRENGTH OF AT LEAST 25 MPA AT 28 DAYS OF AGE

TECHNICAL FIELD

The present disclosure relates to self-consolidating concrete (SCC), and more particularly to a SCC mixture having a compressive strength of at least 25 MPa at 28 days of age.

BACKGROUND

Figure 1A:
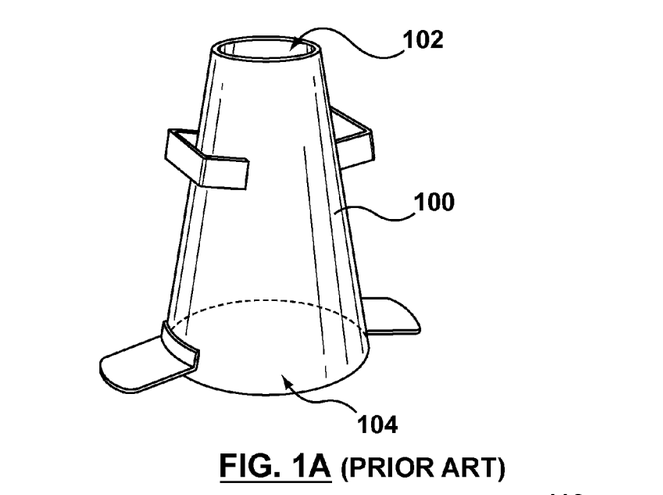
FIG. 1A is a perspective view of a standard slump cone.

Workability of concrete refers to the effort (or energy) required to manipulate a freshly mixed quantity of concrete with minimum loss of homogeneity. The manipulation may refer to pumping, placing, consolidation and/or finishing of the concrete. Workability of concrete is quantified in terms of "slump" or "slump flow". The slump flow test has been standardized as ASTM C 1611, "Slump Flow of Self-Consolidating Concrete." Slump and slump flow are measurements of concrete rheology and is determined using a slump cone. A slump cone is standardized measurement cone having a predefined volume and angle. FIG. 1A illustrates a standard slump cone 100 which includes a top opening 102 and a bottom opening 104.

Figure 1B:
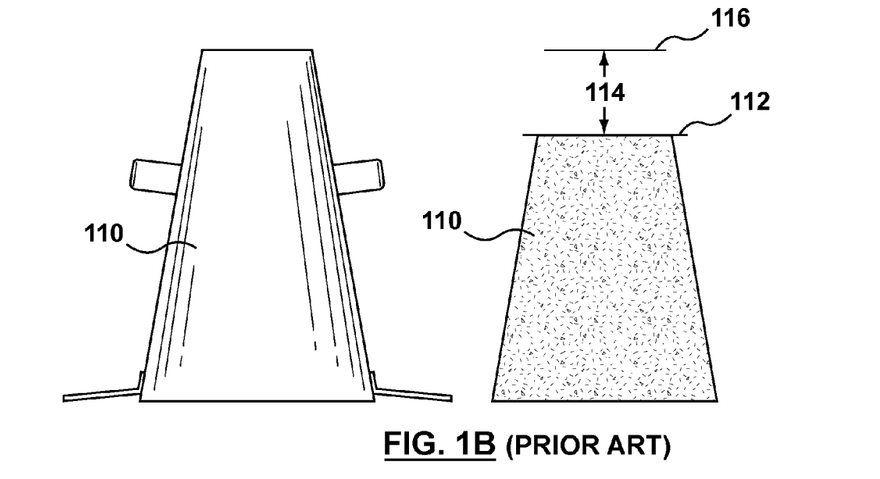
FIG. 1B is an elevational view of the standard slump cone of FIG. 1A and a poured concrete schematically illustrating the use of the slump cone for measuring the slump.
Figure 1C:
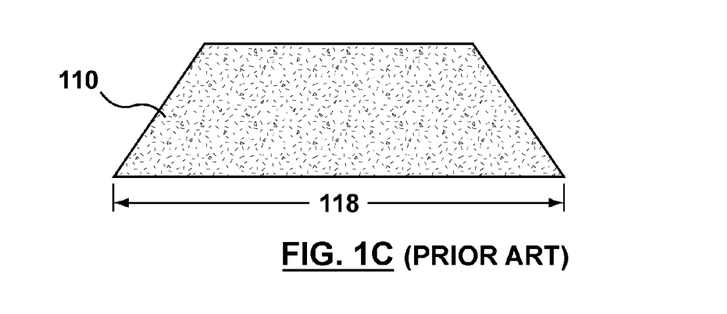
FIG. 1C is an elevational view of the standard slump cone of FIG. 1A and a poured concrete schematically illustrating the use of the slump cone for measuring the slump flow.

The slump cone 100 is used by placing the slump cone 100 on a flat surface and filling the slump cone 100 with fresh concrete through the top opening 102 as shown in FIG. 1B. The slump cone 100 is completely filled and any excess concrete at the top of the slump cone 100 is scraped off. The slump cone 100 is lifted directly upwards. The concrete 110 slowly spreads out over the flat surface without the support of the slump cone 100 to hold the concrete 110 in place. The spreading action causes the height of the concrete 110 to decrease to a height 112 from an initial height 116 corresponding to the height of the slump cone 100. The distance 114 represented by the change in height of the concrete 110 is referred to as the "slump". The "slump" is indicative of the yield value of the concrete. The concrete 110 ultimately spreads out over the flat surface to form a crude disc or pancake shape as shown in FIG. 1C. The diameter 118 of the disc formed by the concrete 110 is referred to as the "slump flow".

Another measurement of the workability of the concrete is the $T_{50}$ test. The $T_{50}$ test quantifies the viscosity of the concrete 110 and measures the amount of time in seconds for the concrete in the slump flow test to spread to a diameter of 50 cm or 500 mm). The $T_{50}$ test has been standardized as ASTM C 1611. The $T_{50}$ time is indicative of the viscosity of the concrete. The slump, slump flow and $T_{50}$ are used to assess the rheological properties of the concrete and predict how it will flow or move under the force of gravity or positive force into a desired shape or position.

Conventional concrete has a slump flow of 80 mm to 120 mm. The placement and finishing of concrete floors in residential and commercial applications using a conventional concrete is difficult, labour intensive and time consuming due to this low slump. Conventional concrete having a minimum compressive strength of 25 MPa is typically designed to have a maximum slump flow of 100 mm; however, water is added in the field to raise the slump flow to 200 mm to improve the workability of the concrete, and in particular the placeability of the concrete. The consequences of adding extra water to increase the water/cement ratio, is to decrease ultimate strength and increase shrinkage.

SCC is a type of concrete characterized by a low yield, moderate viscosity which can be used to ensure a uniform suspension of aggregate during transportation, placement and finishing until the concrete sets. SCC has properties which are desirable in the construction of the concrete floors in residential and commercial applications; however, known SCC compositions are more costly to produce than conventional concrete and provide a surface which is prone to tearing and peeling in response to mechanical working/finishing (smoothing and/or hardening) such as when power troweled. This results in surface defects such as blisters and delaminations which are unacceptable for most applications.

Accordingly, a SCC mixture is desired which is comparable in cost to conventional concrete used in residential and industrial floor construction but which requires less time to place and finish, thus increasing the productivity of the concrete supplier and user.

BRIEF DESCRIPTION OF THE DRAWINGS

FIG. 4 show properties of example embodiments of SCC mixtures prepared in accordance with the present disclosure.

BRIEF SUMMARY OF DISCLOSURE

The present disclosure provides a SCC mixture which seeks to address one or more of the foregoing shortcomings of known SCC mixtures. The present disclosure describes an SCC mixture which forms a surface of partially set concrete which can be hardened by finishing with power troweling equipment. The hardening increases the density of the surface of the concrete, thereby increases its resistance to wear with little or no tearing or peeling of the surface. This allows ready mix trucks to spend less time at the jobsite and less time and labour is required to place and finish the concrete, thereby increasing the productivity of the concrete supplier and user.

In accordance with one example embodiment, there is provided a self-consolidating concrete (SCC) mixture, comprising: a mixture of coarse aggregate (CA), fine aggregate (FA), very fine aggregate (VFA), cementitious materials including Portland cement or Portland limestone cement, an ASTM C494 Type F polycarboxylate ether high range water reducer (also known as a superplasticizer), and water, wherein the VFA has a particle size distribution in which 95% to 100% passes a 2.5 mm sieve and in which 20% to 100% passes a 75 μm sieve.

In some embodiments, the SCC mixture further comprises supplementary cementitious materials. In some embodiments, the amount of supplementary cementitious materials ranges between 5% and 70% by weight of the total cementitious materials, preferably between 5% and 50% by weight of the total cementitious materials.

In some embodiments, the VFA has a methylene blue value of less than 0.75 mg/g at 3 minutes.

In some embodiments, the polycarboxylate ether high range water reducer is present in an amount such that a percent of polycarboxylate solids relative to total cementitious materials ranges between 0.1 and 0.28.

In some embodiments, the SCC mixture has a water-to-cement ratio which ranges between 0.4 and 0.8.

In some embodiments, the VFA principally comprises dust-of-fracture fines. The dust-of-fracture fines may principally comprise non-reactive particles having a significant quantity of particles (at least 20%) of less than 75 μm in size.

In some embodiments, the VFA principally comprises crushed sedimentary aggregate, crushed igneous aggregate, crushed siliceous aggregate or any combination thereof. The crushed sedimentary aggregate may comprise crushed limestone particles. The crushed siliceous aggregate may comprise crushed granite particles. The crushed siliceous aggregate may comprise crushed quartz particles.

In some embodiments, the CA may principally comprise crushed aggregate or natural aggregate (such as gravel), preferably crushed aggregate. The CA principally comprises one or any combination of particles having nominal maximum sizes of 10, 14 and 20 mm.

In some embodiments, the CA principally comprises particles having a nominal maximum size between 10 and 14 mm and the SCC mixture has a slump flow between 350 mm and 750 mm, preferably a slump flow between 550 mm and 650 mm.

In some embodiments, the CA principally comprises particles having a nominal maximum size of 20 mm and the SCC mixture has a slump flow between 350 mm and 650 mm, preferably a slump flow between 450 and 550 mm.

In some embodiments of the above-described embodiments, the SCC mixture has a slump flow of 500 mm or more and a $T_{50}$ time of 5 seconds or less, preferably 4 seconds or less, and more preferably 3 seconds or less. The SCC mixture is non-segregating at the slump flow of 500 mm or more at the specified $T_{50}$ times.

In some embodiments, the SCC mixture has a total amount of VFA particles less than 75 μm has a range between 300 and 500 kg/m$^3$, preferably between 300 and 400 kg/m$^3$.

In some embodiments, the SCC mixture has a compressive strength of at least 25 MPa at 28 days of age, typically between 25 MPa and 40 MPa at 28 days of age.

In some embodiments, wherein the SCC mixture exhibits a drying shrinkage of less than 0.06%.

In some embodiments, the SCC mixture forms a surface layer which is sufficiently non-segregating after an initial setting so as to be capable of being finished with a power trowel without significant adhesion of concrete to blades of the power trowel and without formation of blisters or delamination of the surface layer.

The embodiments of the present disclosure described herein are intended to be examples only. Some alterations, modifications and variations to the described embodiments may be made without departing from the intended scope of the present disclosure. The described embodiments may be combined in many instances unless otherwise stated or unless incompatible with the teachings of the present disclosure. In addition, one or more features of the described embodiments may be used in isolation as a sub-combination or may be combined with other embodiments or sub-combinations in alternate embodiments not explicitly described herein but consistent with the teachings of the present disclosure. Features suitable for such combinations and sub-combinations would be readily apparent to persons skilled in the art upon review of the present disclosure as a whole. The subject matter described herein intends to cover and embrace all suitable changes in technology.

These and other advantages and features of the present disclosure will become more fully apparent from the following description of example embodiments and the appended claims, or may be learned by the practice of the present disclosure as set forth below.

DETAILED DESCRIPTION OF EXAMPLE EMBODIMENTS

The present disclosure describes an SCC mixture which forms a surface of partially set concrete which can be hardened by finishing with power troweling equipment. The hardening increases the density of the surface of the concrete, thereby increases its resistance to wear with little or no tearing or peeling of the surface. This allows ready mix trucks to spend less time at the jobsite and less time and labour is required to place and finish the concrete, thereby increasing the productivity of the concrete supplier and user.

The present disclosure provides a SCC mixture which, in at least some embodiments, has a compressive strength of at least 25 MPa at 28 days of age, typically between 25 MPa and 40 MPa at 28 days of age. Preferably, the SCC mixture is comprised of components which allow the SCC mixture to be manufactured at relatively low cost, thereby providing a low cost SCC mixture. The SCC mixture, in at least some embodiments, includes one or by-products of the manufacture of concrete aggregates from limestone to reduce the cost of the SCC mixture and to provide waste diversion as such by-products are typically disposed of in landfills. Accordingly, the SCC mixture, in at least some embodiments, allows waste products to be beneficially utilized. The by-products of the manufacture of concrete aggregates may comprise very fine aggregate in the form of dust-of-fracture having a substantial quantity of particles (at least 20%) with a size less than 75 μm.

The SCC mixture, in one example embodiment, comprises a mixture of coarse aggregate, fine aggregate, very fine aggregate, cement, an ASTM C494 Type F polycarboxylate ether high range water reducer, and water. The very fine aggregate has a particle size distribution in which 95% to 100% passes a 2.5 mm sieve and in which 20% to 100% passes a 75 μm sieve.

Cement

The cement is Portland cement or Portland limestone cement. The cement may be an ASTM C150 Type I, Type II, Type I/II Portland cement, or limestone modified cements such as CSA A3000 Type GU and GUL. Blended cements conforming to ASTM C595 and CSA A3000 may also be used.

As appreciated by persons skilled in the art, Portland cement is made by heating a source of calcium carbonate (such as limestone) with small quantities of an aluminosilicate such as clay or similar material at a sintering temperature (typically about 1450° C.) in a kiln in a process known as calcination. During calcination a molecule of carbon dioxide is liberated from the calcium carbonate to form calcium oxide which is blended with the secondary materials. The resulting hard substance, called "clinker", is ground with a small amount of gypsum (calcium sulfate dihydrate) and/or anhydrite into a powder. Portland cement reacts with water to form primarily calcium silicate hydrate. The strength of the resultant concrete results from a hydration reaction between the silicate phases of Portland cement and water to form calcium aluminate hydrate $Ca_3Si_2O_{11}H_8$ (3 CaO.2SiO$_2$.4 H$_2$O, or $C_3S_2H_4$ in Cement chemist notation (CCN)) and calcium hydroxide (lime) as a by-product.

Supplementary cementitious materials (SCMs) may, in some embodiments, be partially substituted for Portland cement to improve the durability and ultimate strength of the resultant concrete, react with calcium hydroxide, a by-product of Portland cement hydration to form additional binder which further increases durability and ultimate strength and reduce material costs. The SCMs are silicate or aluminosilicate materials which exhibits pozzolanic properties and may include one or any combination of ground granulated blast furnace slag (GGBFS) (ASTM C989), coal combustion ash (ASTM C618), silica fume (ASTM C1240), rice husk ash or any fine silicate or aluminosilicate material which exhibits pozzolanic properties. Fine silicate or aluminosilicate materials typically have an average particle size of less than 15 microns. The substitution range of Portland cement with the various supplementary cementitious materials will typically range between 5 and 70% by weight, preferably between 5 and 50% by weight to reduce the impact of lower strengths of caused by higher levels of SCMs. Accordingly, in such instances the amount the supplementary cementitious materials ranges between 5% and 70% by weight of the total cementitious materials (i.e., Portland cement or Portland limestone cement and supplementary cementitious materials), preferably between 5% and 50% by weight of the total cementitious materials.

Aggregates

The SCC mixture includes aggregate comprising coarse aggregate (CA), fine aggregate (FA) and very fine aggregate (VFA). The CA may be a crushed aggregate or natural aggregate. In some embodiments, the CA may be crushed calcitic limestone, dolomitic limestone, limestone gravel, crushed granite or other aggregate conforming to the requirements of ASTM C33 or CSA A23.1, or possibly a mixture of two or more thereof.

In some embodiments, the CA principally comprises one or any combination of particles having nominal maximum sizes of 10, 14 and 20 mm meeting CSA or ASTM requirements depending on availability and desired plastic and hardened properties. At the nominal maximum size, no more than 5% of the particles exceed the stated size of 10, 14 or 20 mm. The smaller particles have a lower tendency to settle in the SCC mixture but shrinkage of the concrete may be higher whereas larger particles typically settle faster and exhibit less shrinkage. Moreover, the proportion of the various sizes affects particle packing, which in turn affects rheology and strength of the concrete.

In other embodiments, the CA principally comprises particles having a nominal maximum size between 10 and 14 mm and the SCC mixture has a slump flow between 350 mm and 750 mm, preferably a slump flow between 550 mm and 650 mm. In other embodiments, the CA principally comprises particles having a nominal maximum size of 20 mm and the SCC mixture has a slump flow between 350 mm and 650 mm, preferably a slump flow between 450 mm and 550 mm.

Unexpectedly, research has shown that larger sized CA is preferred for minimizing the potential for plastic and drying shrinkage cracking, however, this lowers the maximum slump flow which can be achieved while increasing the potential for segregation. Intermediate sized CA aggregate, e.g. CA particles having nominal maximum sizes of 10 and 14 mm, is preferred for achieving higher slump flows and minimizing segregation.

The FA may be calcitic (or calcareous) sand, dolomitic sand, siliceous sand or other fine material conforming to the requirements of ASTM C33 or CSA C23.1, or possibly a mixture of two or more thereof. The particular size distribution for the FA is 100% passing through a 10 mm sieve and a maximum percent of 3% passing through a 150 μm sieve. In some embodiment, synthetic materials, such as a light weight aggregate, having the same or similar particle size distribution may be used instead of or in addition to sand to reduce the density of the concrete, when required to reduce load or improve insulating properties. The synthetic light weight aggregate may be haydite and/or pelletized blast furnace slag or other similar material conforming to ASTM C330 or ASTM C332.

The VFA has a particle size distribution in which 95% to 100% passes a 2.5 mm sieve and a minimum of 20% passes a 75 μm sieve. The VFA typically comprises non-reactive particles. Non-reactive VFA particles less than 75 μm in size, such as crushed or ground limestone, granite or quartz are considered fillers and are used to substitute a portion of the cementitious components and increase the volume of fine particles paste fraction of the concrete. The VFA, in at least embodiments, comprises crushed or ground sedimentary aggregate, crushed or ground igneous aggregate, crushed or ground siliceous aggregate or any combination thereof. The crushed sedimentary aggregate may comprise crushed limestone particles. The crushed siliceous aggregate may comprise crushed granite particles. The crushed siliceous aggregate may comprise crushed quartz particles. Dust from drying natural sands is generally not suitable as a source of VFA due to the presence of excessive amounts of naturally associated clay, which has a tendency to adsorb additives, such as various admixtures, and is deleterious to compressive strength.

Preferably, the VFA originates from the crushing, grinding and/or washing of coarse aggregate for concrete commonly known as dust-of-fracture fines. In a preferred embodiment, the VFA principally comprise crushed limestone. As a by-product of the manufacture of concrete aggregates, dust-of-fracture fines reduce the cost of the SCC mixture and provide waste diversion as such by-products are typically disposed of in landfills. The use of dust-of-fracture fines allows the SCC mixture of the present disclosure to be manufactured at relatively low cost and provides a beneficial utilization of a waste product.

Figure 2:
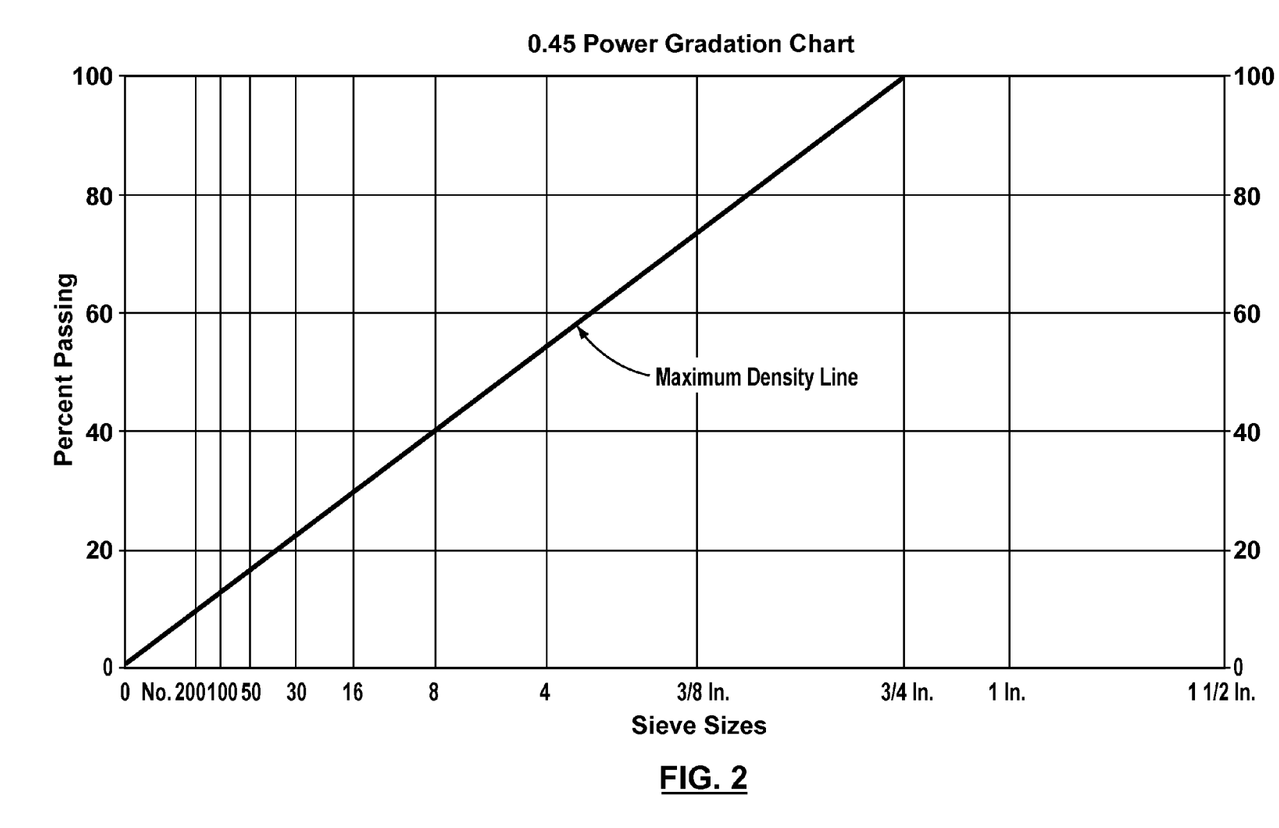
FIG. 2 is an example of a 0.45 power gradation chart.

Research has shown that, unexpectedly, the beneficial rheological properties imparted by VFA do not appear to be due to the optimization of particle packing when the combined size distributions of cementitious materials, VFA, sand and coarse aggregate mixtures are analyzed according to the 0.45 power curve plot shown in FIG. 2. The 0.45 power curve plot (also known as the 0.45 power gradation chart) is based on the mathematically combined percent gradation and has been used to develop uniform gradations for cement mixtures such as Portland cement mixtures.

As illustrated in FIG. 2, the 0.45 power curve plot is a curve plot of the mathematically combined percent gradation for each sieve on a semi-log chart having percent passing on the y-axis and the sieve sizes (in microns) raised to the 0.45 power on the x-axis. In the 0.45 power curve plot shown in FIG. 2, the sieve sizes include the 1½ in. (37.5 mm), 1 in. (25.0 mm), ¾ in. (19.0 mm), ½ in. (12.5 mm), ⅜ in. (9.5 mm), No. 4 (4.75 mm), No. 8 (2.36 mm), No. 16 (1.18 mm), No. 30 (600 μm), No. 50 (300 μm), No. 100 (150 μm) and No. 750 (75 μm). While not shown in FIG. 2, data obtained from a seize analysis of the aggregate under test is plotted and the corresponding data points are connected. A maximum density line is then plotted. As shown in FIG. 2, the maximum density line extends from an origin of the 0.45 power gradation chart to one size larger than first sieve to show 90% or less passing. A well-graded aggregate will follow the maximum density line closely between the largest sieve and 1.18 mm sieve. The combined grading should follow the maximum density line±7% deviation for each percent passing. A minor deviation below the maximum density line can be expected from the 1.18 mm sieve to the 75 μm sieve as a result of fines of the FA and VFA.

Instead of the performance of the SCC mixture following the 0.45 power curve plot as expected, the performance of the SCC mixture is primarily due to the amount of fine particles smaller than 75 µm, which typically comprises all of the cement, SCMs and fine fractions of the FA and VFA. Particles having a size less than 75 µm contribute to the volume of the concrete paste which is principally comprised of water, cement, SCMs, FA and VFA.

The total content of VFA particles less than 75 µm in the SCC mixtures of the present disclosure ranges from 300 and 500 kg/m$^3$, and preferably between 300 to 400 kg/m$^3$. This is significantly lower than typical or conventional SCC mixtures which have a total VFA particle content between 475 and 600 kg/m$^3$ to achieve a non-segregating mixture. Conventional SCC mixtures typically use cementitious materials and ground limestone with an average particle size between 3 µm and 15 µm as the source of filler to achieve the required volume of fine particles. Without wishing to be being bound by theory, it is noted that particles greater than 75 µm and less than 2.5 mm, which are considered fine aggregate, may play a functional role in the SCC mixtures of the present disclosure because the total content of particles less than 75 µm is considered insufficient to provide the required flow characteristics and resistance to segregation.

The VFA should have a suitable methylene blue value. The methylene blue value is an indicator of the amount and type of clay present in aggregate and can therefore be useful in distinguishing between harmful and beneficial fines. One example of a methylene blue test is provided the Grace Rapid Clay Test procedure, which is described in the Grace Rapid Clay Test Kit, Step-by-Step Procedure, Version C2, February 2011, which is incorporated herein by reference. In embodiments in which the SCC mixture includes a plasticizer, the VFA should have a methylene blue value of less than 0.75 mg/g at 3 minutes, preferably 0.4 mg/g at 3 minutes, to avoid excessive adsorption of the plasticizer, such as polycarboxylate ether type high range water reducers. High levels of adsorption reduce the concentration of the polycarboxylate superplasticizer and therefore reduce the slump flow of the SCC mixture.

Reinforcement

The SCC mixtures of the present disclosure may also include fibers to at partially replace, or possibly supplement, welded wire mesh as secondary reinforcement in some embodiments. The fibers provide resistance to impact by increasing the flexural and tensile strength of the concrete. Reinforcement increases the amount of energy required to cause rupture and complete failure. The fibers and other reinforcing materials provide strength when cracks form in the concrete. When a crack forms in the concrete, the reinforcing materials bridge the void created by the crack and allow the concrete to deform in a ductile manner.

The fibers may be steel, polypropylene, nylon or a combination thereof. The fibers and welded wire reinforcement reduce cracking due to drying shrinkage. The steel fibers may range in length from 12.5 mm to 50 mm and have an aspect ratio of 50 to 80. The volume fraction of steel fibers may range between 0.25% and 3%. Polypropylene fibers may range in length from 25 mm to 40 mm and have diameters between 0.2 mm to 0.6 mm. An example of polypropylene fibers suitable for secondary reinforcement in concrete is STRUX® 90/40, manufactured by W. R. Grace & Co. (Connecticut, United States), which has a length, diameter and aspect ratio of 40 mm, 0.43 mm and 90, respectively. Fibrillated or monofilament polypropylene fibers having lengths of 6.25 mm to 20 mm and diameters of 15 µm to 40 µm (for the monofilament fibers) may be added to reduce the potential for plastic shrinkage cracking when the estimated evaporation rate exceeds 1 kg/m$^2$-hr. An example of a fibrillated polypropylene fiber suitable for this type of application is the 19 mm "Grace Fiber", and 19 mm "Grace Microfiber" monofilament fiber manufactured by W. R. Grace & Co.

Admixture/Additives

Any of the admixture types listed in ASTM C494 may be used in the SCC mixture of the present disclosure. Chloride and non-chloride based set accelerators may be used when ambient temperatures are low (e.g., 1° C. to 15° C. or lower) whereas set retarders may be used when temperatures are high (e.g., greater than 28° C.).

Preferably, the SCC mixture of the present disclosure includes a plasticizer, more preferably a superplasticizer such as polycarboxylate ether (PCE) high range water reducer conforming to the requirements of ASTM C 494 Type F (water reducing, high range). At suitable dosage rates relative to the cement, the PCE high range water reducer imparts a very high fluidity to the SCC mixture for 45 to 75 minutes without causing excessive retardation of hydration or segregation. Sulfonated naphthalene or melamine formaldehyde condensate based superplasticers conforming to ASTM C494 Type F may be used instead of the PCE high range water reducer with or without a viscosity modifying additive to obtain a desired consistency. However, the amount of time available for transportation, placement and finishing will be significantly less. It is contemplated that other superplasticizers or high range water reducers could be used in other embodiments.

Special Admixtures/Additives

Viscosity modifiers may be used when required to reduce the potential for segregation of the concrete. Viscosity modifiers are particularly useful with SCC mixtures having a slump flow is greater than 650 mm and/or SCC mixtures with larger coarse aggregate, such as 20 mm coarse aggregate. Defoaming admixtures which de-entrain air from the SCC mixture may be used when required, typically in instances when the specific combination of materials results in air contents greater than 4%. Although generally unnecessary, shrinkage reducing admixtures (SRA) may be added to reduce drying shrinkage when lower shrinkage values are required, or a given combination of materials exhibit greater shrinkage or placement conditions (e.g., lack of secondary reinforcement, low relative humidity) promote shrinkage.

SCC Mixture Properties

The SCC mixture of the present disclosure, in at least some embodiments, has a compressive strength of at least 25 MPa at 28 days of age, typically between 25 MPa and 40 MPa at 28 days of age. However, a compressive strength of up to 50 to 60 MPa at 28 days of age is also possible for some embodiments. The SCC mixture forms a surface layer which is sufficiently non-segregating after an initial setting so as to be capable of finishing with a power trowel without significant adhesion of concrete to blades of the power trowel and without formation of blisters or delamination of the surface layer.

The SCC mixture of the present disclosure, in at least some embodiments, has a slump flow of 500 mm or more and a $T_{50}$ time of 5 seconds or less, preferably 4 seconds or less, and more preferably 3 seconds or less. Testing of the SCC mixtures has shown $T_{50}$ times of 1½ to 4 seconds, and more typically 2 to 3 seconds, have been achieved or projected. It will be appreciated that such $T_{50}$ times are lower than conventional SCC mixtures. It was also observed that the SCC mixture is non-segregating at the slump flow of 500 mm or more at the specified $T_{50}$ times.

The SCC mixture, in at least some embodiments, exhibits a drying shrinkage of less than 0.06% or less, preferably 0.05% or less, and more preferably 0.04% or less. This amount of drying shrinkage was observed when testing cast concrete prisms having dimensions of 100 mm ×100 mm ×250 mm and exposed to a relative humidity of 50% according to CSA A23.2-21C. Concrete with drying shrinkage values of less than 0.06% generally have a lower tendency to exhibit curling and cracking in concrete applications.

EXAMPLES

Non-limiting examples of SCC mixtures prepared in accordance with the present disclosure will now be described. Table 1 describes example embodiments SCC mixtures which were found to form a surface layer which is sufficiently non-segregating after an initial setting so as to be capable of finishing with a power trowel without significant adhesion of concrete to blades of the power trowel and without formation of blisters or delamination of the surface layer and a compressive strength of at least 25 MPa at 28 days of age.

FIG. 4 show properties of example SCC mixtures 24, 2-2 and 2-3 prepared in accordance with the present disclosure. As shown in Examples 2-1, 2-2 and 2-3, the SCC mixtures exhibited a compressive strength of at least 25 MPa at 28 days of age, typically between 25 MPa and 40 MPa at 28 days of age. The SCC mixtures in in Examples 2-1, 2-2 and 2-3 included VFA particles as described above, which exhibited a content of 6, 8, 10 or 12% compared with a moisture content of 1.75% for 10 mm gravel (coarse aggregate) and 4.0% for sand. The moisture content of the VFAs may vary in other embodiments.

Table 2, shown below, describes the range of SCC mixture compositions which are considered to form a surface layer which is sufficiently non-segregating after an initial setting so as to be capable of finishing with a power trowel without significant adhesion of concrete to blades of the power trowel and without formation of blisters or delamination of the surface layer and a compressive strength of at least 25 MPa at 28 days of age.

TABLE 1

Example SCC Mixtures

| Cement Type (CSA) | Type 10 | Type 10 | Type 10 | Type 10 | Type 10 |
|---|---|---|---|---|---|
| Product Type | Precast | Basement Floor | Basement Floor | Basement Floor | Basement Floor |
| Estimated Cost ($/m³) | 98.60 | 88.40 | 93.40 | 91.20 | 90.90 |
| Admixture (ml/100 kg) | | | | | |
| G7700 | 550 | 650 | 645 | 600 | 600 |
| PS1390 | 150 | 300 | 150 | 150 | 150 |
| VMA362 | 150 | 150 | 150 | 150 | 150 |
| Total Cementitious (kg/m³) | 329.1 | 252.1 | 276.0 | 280.0 | 281.2 |
| Mixture Composition (kg/m³) | | | | | |
| Cement | 246.8 | 189.1 | 207.0 | 210.0 | 210.9 |
| Limestone Filler | 0.0 | 0.0 | 0.0 | 0.0 | 0.0 |
| GGBFS | 82.3 | 63.0 | 69.0 | 70.0 | 70.3 |
| Coarse Aggregate | 688.5 | 795.0 | 746.1 | 708.1 | 705.0 |
| Fine Aggregate | 779 | 922 | 865 | 794 | 789 |
| Very Fine Aggregate | 251 | 274 | 257 | 270 | 271 |
| Water | 201.7 | 162.2 | 177.4 | 185.6 | 192.0 |
| Density (kg/m³) | 2252.4 | 2406.8 | 2324.0 | 2240.7 | 2240.7 |
| Paste Content (fraction) | 0.401 | 0.300 | 0.328 | 0.375 | 0.381 |
| W/C Ratio | 0.62 | 0.65 | 0.65 | 0.67 | 0.69 |
| Slump Flow (mm) | 610 | 500 | 580 | 540 | 565 |
| $T_{50}$ (s) | n/a | n/a | 4.3 | 4.31 | 3 |
| Appearance (VSI) | 0 | 0 | 0 | 0 | 0 |
| Setting Time (hours) | | | | | |
| Initial | n/a | n/a | n/a | n/a | n/a |
| Final | n/a | n/a | n/a | n/a | n/a |
| Compressive Strength (MPa) - tested on 100 mm × 200 mm cast concrete cylinder | | | | | |
| 1 day | 10.9 | n/a | 11.3 | n/a | 10.7 |
| 7 day | 26.9 | n/a | 28.7 | n/a | 26.0 |
| 28 day | 37.9 | n/a | 40.5 | n/a | 37.2 |
| 56 day | 44.6 | n/a | 45.4 | n/a | 42.2 |

TABLE 2

SCC Mixture Compositions

| Component | kg/m³ Minimum | kg/m³ Maximum | Percent (%) Minimum | Percent (%) Maximum |
|---|---|---|---|---|
| Total cementitious materials | 260 | 375 | 10.5 | 16.5 |
| Slag content (%)[1] | | | 0 | 50 |
| Fly ash (%)[1] | | | 0 | 35 |
| Silica fume (%)[1] | | | 0 | 10 |
| Coarse aggregate | 700 | 1130 | 29 | 46 |
| Fine Aggregate | 481 | 1010 | 19.5 | 42 |
| Very fine aggregate | 135 | 500 | 5.5 | 20 |
| water/total cementitious materials ratio[2] | 0.4 | 0.8 | | |
| Polycarboxylic ether[3] | 0.1 | 0.28 | | |

[1] % relative total cementitious materials
[2] total cementitious materials being comprised of Portland cement, slag, fly ash, silica fume
[3] % polycarboxylate solids relative to total cementitious materials It will be appreciated that the polycarboxylate ether high range water reducer is prepared as an admixture which is added to the SCC mixture during preparation of the CC mixture. The admixture of the polycarboxylate ether high range water may vary in concentration. Accordingly, the amount of the polycarboxylate ether high range water reducer present in the SCC mixture is quantified herein as a percent of polycarboxylate solids relative to total cementitious materials in accordance with the convention in the art.

Table 3, shown below, describes a preferred range of SCC mixture compositions which are considered to form a surface layer which is sufficiently non-segregating after an initial setting so as to be capable of finishing with a power trowel without significant adhesion of concrete to blades of the power trowel and without formation of blisters or delamination of the surface layer and a compressive strength of at least 25 MPa at 28 days of age.

TABLE 3

SCC Mixture Compositions Preferred Ranges

| Component | kg/m³ Minimum | kg/m³ Maximum | Percent (%) Minimum | Percent (%) Maximum |
|---|---|---|---|---|
| Total cementitious materials | 280 | 335 | 11.6 | 13.5 |

TABLE 3-continued

SCC Mixture Compositions Preferred Ranges

| | kg/m³ | | Percent (%) | |
|---|---|---|---|---|
| Component | Minimum | Maximum | Minimum | Maximum |
| Slag content (%)[1] | | | 0 | 50 |
| Fly ash (%)[1] | | | 0 | 35 |
| Silica fume (%)[1] | | | 0 | 10 |
| Coarse aggregate | 900 | 1120 | 37 | 45 |
| Fine Aggregate | 481 | 805 | 19.5 | 32.5 |
| Very fine aggregate | 270 | 395 | 11 | 16 |
| water/total cementitious materials ratio[2] | 0.45 | 0.65 | | |
| Polycarboxylic ether[3] | 0.1 | 0.28 | | |

Figure 3:
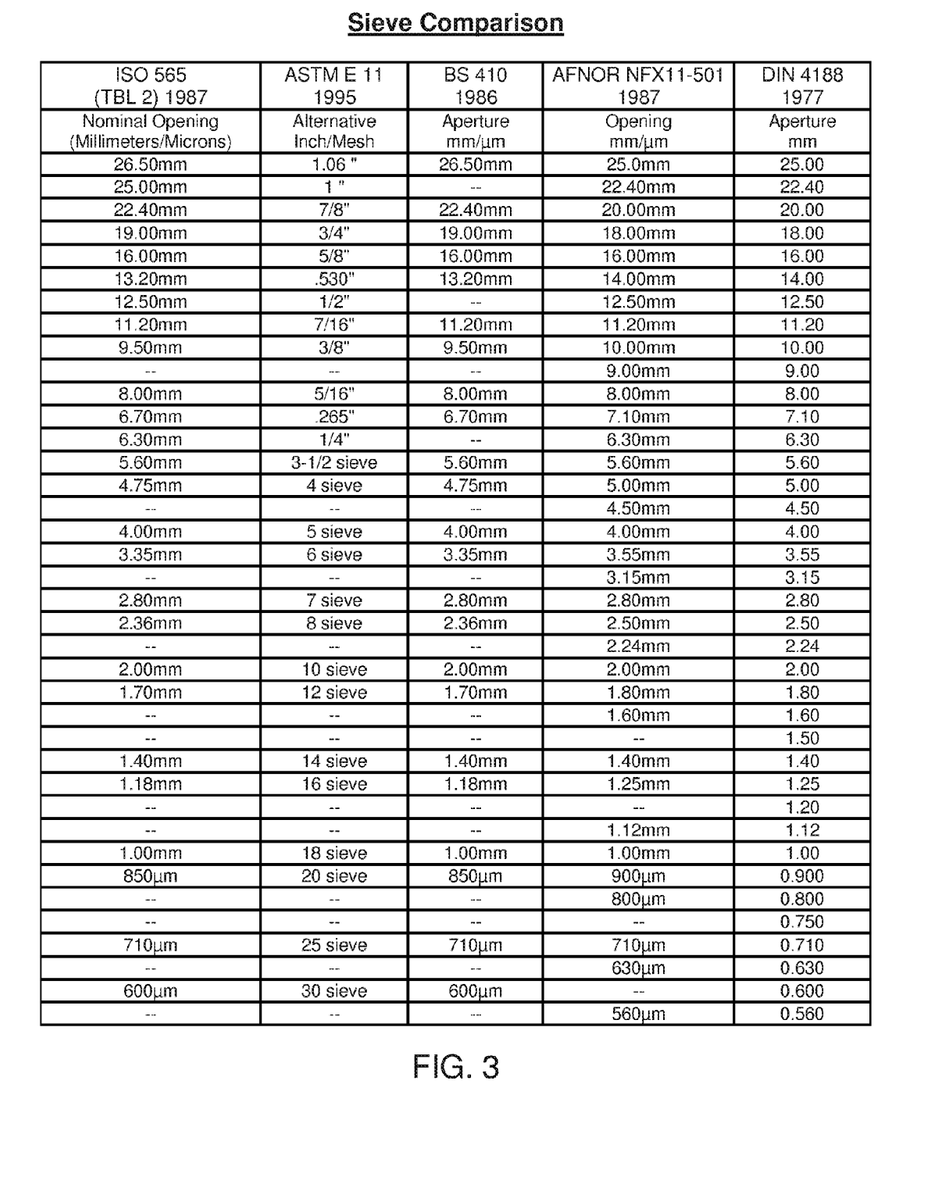
FIG. 3 is a sieve comparison chart.

[1] % relative total cementitious materials
[2] total cementitious materials being comprised of Portland cement, slag, fly ash, silica fume
[3] % polycarboxylate solids relative to total cementitious materials The present disclosure refers to particle sizes based on a sieve analysis. It will be appreciated by persons skilled in the art that seizes are standardized to have specific aperture opening sizes and that different standards having different sieves exist. FIG. 3 provides a sieve comparison chart which compares various sieves and the respective aperture sizes of the sieve openings according to some of the most common standards. Sieves on the same line are generally considered to be functionally equivalent in some applications; however, in some cases sieves on adjacent lines (typically only immediately adjacent lines) are considered to be functionally equivalent. For example, the 2.36 mm and 2.5 mm sieve are functionally equivalent, the 9.5 mm and 10 mm sieves are functionally equivalent, the 13.2 mm and 14 mm sieves are functionally equivalent, and the 19 mm and 20 mm sieves are functionally equivalent for the purposes of the SCC mixture of the present disclosure.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description.

The invention claimed is:

1. A self-consolidating concrete (SCC) mixture, comprising:
a mixture of coarse aggregate (CA), fine aggregate (FA), very fine aggregate (VFA), cementitious materials including Portland cement or Portland limestone cement, an ASTM C494 Type F polycarboxylate ether high range water reducer, and water, wherein the VFA has a particle size distribution in which 95-100% passes a 2.5 mm sieve and in which 20 to 100% passes a 75 μm sieve;
wherein:
the total cementitious materials are present in an amount between 260 and 375 kg/m³;
CA is present in an amount between 700 and 1130 kg/m³;
FA is present in an amount between 481 and 1010 kg/m³;
VFA is present in an amount between 135 and 500 kg/m³;
ASTM C494 Type F polycarboxylate ether high range water reducer is present in an amount between 0.1 and 0.28 weight percent of polycarboxylate solids relative to total cementitious materials; and
wherein the SCC mixture has a water-to-cement ratio which ranges between 0.4 and 0.8.

2. The SCC mixture of claim 1, wherein the VFA principally comprises dust-of-fracture fines.

3. The SCC mixture of claim 2, wherein the dust-of-fracture fines principally comprise non-reactive particles having a particle size of less than 75 μm.

4. The SCC mixture of claim 1, wherein the VFA principally comprises crushed sedimentary aggregate, crushed igneous aggregate, crushed siliceous aggregate or any combination thereof.

5. The SCC mixture of claim 4, wherein the crushed sedimentary aggregate comprises crushed limestone particles.

6. The SCC mixture of claim 4, wherein the crushed siliceous aggregate comprises crushed granite particles.

7. The SCC mixture of claim 4, wherein the crushed siliceous aggregate comprises crushed quartz particles.

8. The SCC mixture of claim 1, wherein the CA principally comprises one or any combination of particles having nominal maximum sizes of 10 mm, 14 mm and 20 mm.

9. The SCC mixture of claim 8, wherein the CA principally comprises crushed aggregate.

10. The SCC mixture of claim 1, wherein the cementitious materials further include supplementary cementitious materials.

11. The SCC mixture of claim 10, wherein the supplementary cementitious materials range between 5% and 50% by weight of the total cementitious materials.

12. The SCC mixture of claim 1, wherein the VFA has a methylene blue value of less than 0.75 mg/g at 3 minutes.

13. The SCC mixture of claim 1, wherein the CA principally comprises particles having a nominal maximum size between 10 mm and 14 mm and the SCC mixture has a slump flow between 350 mm and 750 mm.

14. The SCC mixture of claim 13, wherein the SCC mixture has a slump flow between 550 mm and 650 mm.

15. The SCC mixture of claim 1, wherein the CA principally comprises particles having a nominal maximum size of 20 mm and the SCC mixture has a slump flow between 350 mm and 650 mm.

16. The SCC mixture of claim 15, wherein the SCC mixture has a slump flow between 450 mm and 550 mm.

17. The SCC mixture of claim 1, wherein the SCC mixture has a slump flow of 500 mm or more and a $T_{50}$ time of 5 seconds or less.

18. The SCC mixture of claim 17, wherein the SCC mixture is non-segregating at the slump flow of 500 mm or more in the $T_{50}$ time.

19. The SCC mixture of claim 1, wherein VFA particles having a particle size less than 75 μm are present in an amount ranging between 300 and 500 kg/m³.

20. The SCC mixture of claim 19, wherein VFA particles having a particle size less than 75 μm are present in an amount ranging between 300 and 400 kg/m³.

21. The SCC mixture of claim 1, wherein the SCC mixture has a compressive strength of at least 25 MPa at 28 days of age.

22. The SCC mixture of claim 1, wherein the SCC mixture exhibits a drying shrinkage of less than 0.06%.

23. The SCC mixture of claim 1, wherein the SCC mixture forms a surface layer which is sufficiently non-segregating after an initial setting so as to be capable of finishing with a power trowel without significant adhesion of concrete to blades of the power trowel and without formation of blisters or delamination of the surface layer.

24. The SCC mixture of claim 1, wherein:
total cementitious materials are present in an amount between 280 and 335 kg/m³;
CA is present in an amount between 900 and 1120 kg/m³;

FA is present in an amount between 481 and 805 kg/m³;

VFA is present in an amount between 270 and 395 kg/m³;

ASTM C494 Type F polycarboxylate ether high range water reducer is present in an amount between 0.1 and 0.28 weight percent of polycarboxylate solids relative to total cementitious materials; and wherein the SCC mixture has a water-to-cement ratio which ranges between 0.45 and 0.65.

25. The SCC mixture of claim 10, wherein the supplementary cementitious materials include one or a combination of slag, fly ash or silica fume.

26. The SCC mixture of claim 25, wherein:

slag is present in an amount between 0 and 50% of the total cementitious materials;

fly ash is present in an amount between 0 and 35% of the total cementitious materials; and silica fume is present in an amount between 0 and 10% of the total cementitious materials.

* * * * *